United States Patent
Kim et al.

(10) Patent No.: US 10,147,935 B2
(45) Date of Patent: Dec. 4, 2018

(54) ELECTRODE INCLUDING ALTERNATELY ARRANGED ELECTRODE MIXTURE PARTS AND IRREVERSIBLE PARTS AND SECONDARY BATTERY INCLUDING THE SAME

(71) Applicant: LG Chem, Ltd., Seoul (KR)

(72) Inventors: Seok Koo Kim, Daejeon (KR); In Chul Kim, Daejeon (KR); Je Young Kim, Daejeon (KR); Hyun Min Kim, Daejeon (KR); Jung Ah Shim, Daejeon (KR); Sei Woon Oh, Daejeon (KR); Eun Ju Lee, Daejeon (KR); Ji Eun Lee, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/507,449

(22) PCT Filed: Sep. 24, 2015

(86) PCT No.: PCT/KR2015/010045
§ 371 (c)(1),
(2) Date: Feb. 28, 2017

(87) PCT Pub. No.: WO2016/056775
PCT Pub. Date: Apr. 14, 2016

(65) Prior Publication Data
US 2017/0288207 A1    Oct. 5, 2017

(30) Foreign Application Priority Data
Oct. 6, 2014 (KR) .......... 10-2014-0134330

(51) Int. Cl.
H01M 4/02      (2006.01)
H01M 4/131     (2010.01)
(Continued)

(52) U.S. Cl.
CPC ......... *H01M 4/131* (2013.01); *H01M 4/0404* (2013.01); *H01M 4/13* (2013.01);
(Continued)

(58) Field of Classification Search
CPC ........ H01M 4/131; H01M 4/13; H01M 4/485; H01M 4/62; H01M 4/0404; H01M 4/136; H01M 4/1391; H01M 4/75; H01M 4/0525
See application file for complete search history.

(56) References Cited

U.S. PATENT DOCUMENTS

| | | | |
|---|---|---|---|
| 2012/0021284 A1 | 1/2012 | Lee et al. | |
| 2014/0050977 A1 | 2/2014 | Sanada et al. | |
| 2014/0302422 A1* | 10/2014 | Shao | H01M 8/188 |
| | | | 429/498 |

FOREIGN PATENT DOCUMENTS

| | | |
|---|---|---|
| JP | 2010067508 A | 3/2010 |
| JP | 2012038539 A | 2/2012 |

(Continued)

OTHER PUBLICATIONS

Search report from International Application No. PCT/KR2015/010045, dated Jan. 6, 2016.

*Primary Examiner* — Jane J Rhee
(74) *Attorney, Agent, or Firm* — Lerner, David, Littenberg, Krumholz & Mentlik, LLP

(57) ABSTRACT

Disclosed herein are an electrode configured such that electrode mixture parts, each of which includes an electrode active material, and irreversible parts, each of which includes an irreversible additive, are alternately coated on one surface or both surfaces of a current collector to form an electrode pattern and a secondary battery including the same.

20 Claims, 1 Drawing Sheet

(51) Int. Cl.
*H01M 4/13* (2010.01)
*H01M 4/485* (2010.01)
*H01M 4/62* (2006.01)
*H01M 4/04* (2006.01)
*H01M 4/136* (2010.01)
*H01M 4/1391* (2010.01)
*H01M 4/75* (2006.01)
*H01M 10/0525* (2010.01)

(52) U.S. Cl.
CPC ......... *H01M 4/136* (2013.01); *H01M 4/1391* (2013.01); *H01M 4/485* (2013.01); *H01M 4/62* (2013.01); *H01M 4/75* (2013.01); *H01M 10/0525* (2013.01); *Y02T 10/7011* (2013.01)

(56) References Cited

FOREIGN PATENT DOCUMENTS

| | | |
|---|---|---|
| JP | 2014063645 A | 4/2014 |
| KR | 20120009703 A | 2/2012 |
| KR | 20130003591 A | 1/2013 |
| KR | 20140024207 A | 2/2014 |

\* cited by examiner

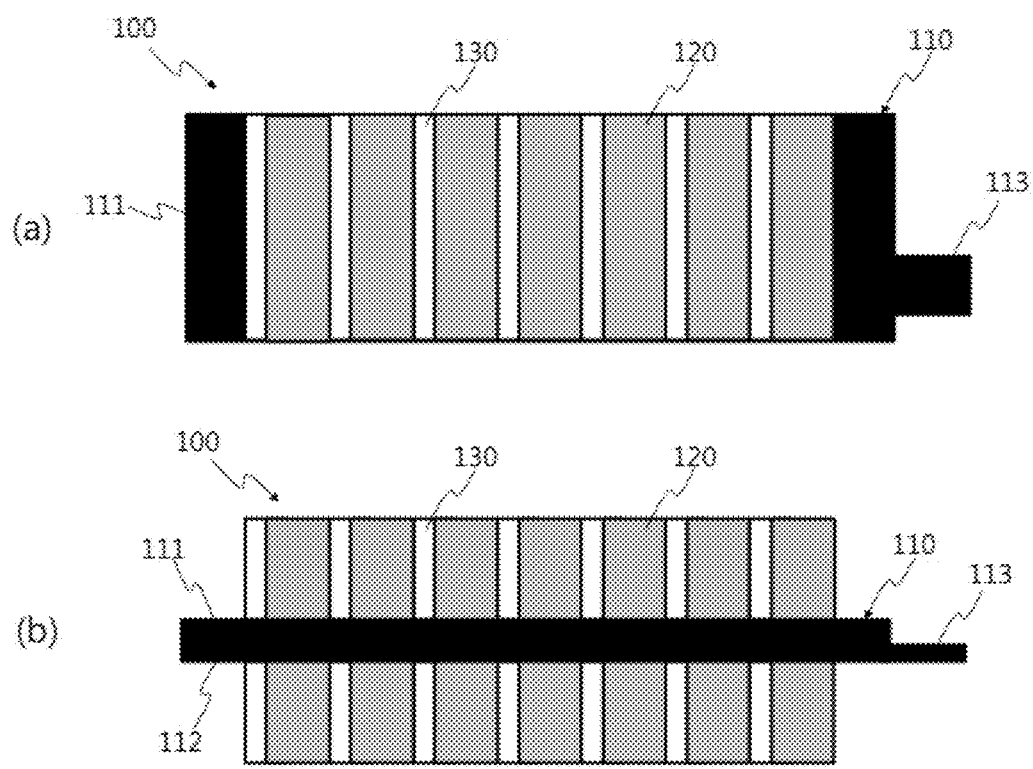

ELECTRODE INCLUDING ALTERNATELY ARRANGED ELECTRODE MIXTURE PARTS AND IRREVERSIBLE PARTS AND SECONDARY BATTERY INCLUDING THE SAME

CROSS-REFERENCE TO RELATED APPLICATIONS

The present application is a national phase entry under 35 U.S.C. § 371 of International Application No. PCT/KR2015/010045, filed Sep. 24, 2015, which claims priority from Korean Patent Application No. 10-2014-0134330 filed on Oct. 6, 2014 with the Korean Intellectual Property Office, the disclosures of which are herein incorporated by reference in their entirety.

TECHNICAL FIELD

The present invention relates to an electrode including alternately arranged electrode mixture parts and irreversible parts and a secondary battery including the same.

BACKGROUND ART

As mobile device technology continues to develop and demand therefor continues to increase, demand for secondary batteries as energy sources is rapidly increasing. Among these secondary batteries, lithium secondary batteries, which exhibit high energy density and voltage, a long lifespan, and a low self-discharge rate, are commercially available and widely used.

As positive electrode active materials for such lithium secondary batteries, lithium-containing cobalt oxides such as $LiCoO_2$ are mainly used. In addition, lithium-containing manganese oxides, such as $LiMn_2O_4$, which has a spinel crystal structure, and lithium-containing nickel oxides, such as $LiNiO_2$, are also used. In particular, lithium-containing manganese oxides, such as $LiMnO_2$ and $LiMn_2O_4$, are advantageous in that they contain manganese, which is an abundant and environmentally friendly raw material. In addition, it is possible to manufacture a high-capacity lithium secondary battery using such lithium-containing manganese oxides. In recent years, therefore, lithium-containing manganese oxides have attracted attention as a positive electrode active material for lithium secondary batteries. As a negative electrode active material, carbon-based materials are mainly used, and the use of lithium metals, sulfur compounds, etc. is also considered.

In the case in which the efficiency of a positive electrode and the efficiency of a negative electrode are adjusted so as to be similar to each other, it is possible to minimize inefficient usage, or waste, of the electrode. For example, in the case in which a positive electrode having an efficiency of 100% and a negative electrode having an efficiency of 100% are used, a battery has an efficiency of 100%. On the other hand, in the case in which a positive electrode having an efficiency of 90% and a negative electrode having an efficiency of 100% are used, a battery has an efficiency of 90%. That is, 10% of the negative electrode is needlessly wasted.

In particular, in the case in which a carbon-based material is used as a negative electrode active material and a high-capacity lithium-containing manganese oxide as a positive electrode active material, the irreversible efficiency of the negative electrode during initial charging and discharging, including the first charging, is 90% or higher, whereas the initial irreversible efficiency of the positive electrode is 80 to 90%.

In addition, irreversible operation of the electrode having high irreversible efficiency is caused due to the difference in irreversible efficiency between the positive electrode and the negative electrode. In order to prevent such irreversible operation, it is necessary to use a larger amount of active material of the negative electrode having high irreversible efficiency.

In order to adjust the efficiency of the positive electrode and the efficiency of the negative electrode so as to be similar to each other at the time of designing the secondary battery, therefore, an irreversible additive may be added to the positive electrode and/or the negative electrode.

In this case, however, lithium escapes from the positive electrode during initial formation, and then the irreversible additive becomes an inactive material, with the result that the energy density of the positive electrode is reduced.

On the other hand, high loading of the electrode is necessary to increase the capacity of the battery. In this case, however, the thickness of the electrode is increased, with the result that it is difficult for the electrode to be completely impregnated with an electrolytic solution. In addition, the concentration of the electrolytic solution is polarized, with the result that the resistance of the electrode is increased, whereby the output of the electrode is reduced.

Therefore, there is a high necessity for technology that is capable of solving the above problems.

DISCLOSURE

Technical Problem

Therefore, the present invention has been made to solve the above problems and other technical problems that have yet to be resolved.

As a result of a variety of extensive and intensive studies and experiments to solve the problems described above, the inventors of the present application have found that, in the case in which an electrode is configured to have a structure in which electrode mixture parts, each of which includes an electrode active material, and irreversible parts, each of which includes an irreversible additive, are alternately arranged, it is possible to easily design irreversible efficiency and to solve problems with a high-capacity battery in that impregnation with an electrolytic solution is difficult and the concentration of the electrolytic solution is polarized, whereby it is possible to restrain an increase in the resistance of the electrode. The present invention has been completed based on these findings.

Technical Solution

In accordance with one aspect of the present invention, the above and other objects can be accomplished by the provision of an electrode configured such that electrode mixture parts, each of which includes an electrode active material, and irreversible parts, each of which includes an irreversible additive, are alternately coated on one surface or both surfaces of a current collector to form an electrode pattern.

The structure in which the electrode mixture parts and the irreversible parts are alternately arranged is not particularly restricted as long as the electrode mixture parts and the irreversible parts are alternately provided. The electrode mixture parts and the irreversible parts may be alternately arranged in the vertical direction or the horizontal direction on the basis of the position of an electrode terminal of the electrode. Each of the electrode mixture parts and the irreversible parts may be formed in a strip shape when viewed from above.

As described above, an electrode coating layer constituted by the electrode mixture parts and the irreversible parts may be formed on one surface or each surface of the current collector. In terms of capacity, the electrode coating layer may be formed on each surface of the current collector. The structure of the electrode is not particularly restricted as long as the electrode mixture parts and irreversible parts are alternately arranged on any one surface of the current collector. In a concrete example, the structure in which the electrode mixture parts and the irreversible parts are alternately arranged on one surface of the current collector and the structure in which the electrode mixture parts and the irreversible parts are alternately arranged on the other surface of the current collector may be identical to each other.

That is, in the case in which the electrode mixture parts and the irreversible parts are alternately coated on the both surfaces of the current collector, the structure in which the electrode mixture parts and the irreversible parts are alternately arranged is not particularly restricted as long as the electrode mixture parts and the irreversible parts are alternately arranged on the opposite surfaces of the current collector in the state in which the electrode mixture parts and the irreversible parts alternately arranged on one surface of the current collector and the electrode mixture parts and the irreversible parts alternately arranged on the other surface of the current collector are not affected by each other. In consideration of ease of processing, it is preferable that the structure in which the electrode mixture parts and the irreversible parts are alternately arranged on one surface of the current collector and the structure in which the electrode mixture parts and the irreversible parts are alternately arranged on the other surface of the current collector be identical to each other.

In an electrode assembly including a plurality of stacked electrodes, the structure in which the electrode mixture parts and the irreversible parts are alternately arranged is not particularly restricted as long as the alternate arrangement structures of adjacent electrodes are not affected by each other. Preferably, in terms of ease and simplification of electrode manufacturing process, the structure in which the electrode mixture parts and the irreversible parts are alternately arranged in one electrode is identical to the structure in which the electrode mixture parts and the irreversible parts are alternately arranged in another electrode that is adjacent to the one electrode, as described above.

Specifically, in consideration of the desired capacity of the battery, the electrode mixture parts, each of which includes an electrode active material, may be coated on 10 to 99% of the total area of the electrode when viewed from above. More specifically, the electrode mixture parts, each of which includes an electrode active material, may be coated on 50 to 99% of the total area of the electrode when viewed from above.

In the case in which the coated area of the electrode mixture parts is less than 10% of the total area of the electrode, the contents of the electrode active material are too small, with the result that the capacity of the battery obtained by each electrode is reduced. In order to obtain the desired capacity of the battery, the size of the electrode assembly may be greatly increased, which is undesirable. In the case in which the coated area of the electrode mixture parts is greater than 99% of the total area of the electrode, the effect of adjusting the irreversible efficiency by the provision of the irreversible parts is difficult to obtain, which is also undesirable.

In consideration of ease of processing, the electrode mixture parts and the irreversible parts may be coated at predetermined intervals. However, the present invention is not limited thereto. The electrode mixture parts and the irreversible parts may be coated at arbitrary intervals. Alternatively, the electrode mixture parts and the irreversible parts may be coated at intervals that are gradually decreased or increased from the middle to the edge of the electrode.

Here, the term "interval" means the distance between adjacent electrode mixture parts or adjacent irreversible parts. In the structure in which the electrode mixture parts and the irreversible parts are alternately arranged, the interval between adjacent electrode mixture parts is the coated width of each of the irreversible parts, and the interval between adjacent irreversible parts is the coated width of each of the electrode mixture parts FIG. 1 is a plan view (a) and a side view (b) showing an electrode according to an embodiment of the present invention.

Referring to FIGS. 1(a) and 1(b), an electrode 100 according to the present invention is configured such that electrode mixture parts 120, each of which includes an electrode active material, and irreversible parts 130, each of which includes an irreversible additive, are alternately coated on opposite surfaces 111 and 112 of a current collector 110 to form an electrode pattern.

Specifically, the electrode mixture parts 120 and the irreversible parts 130 are alternately arranged in the vertical direction on the basis of the position of an electrode terminal 113 in the state of being formed in a strip shape when viewed from above. The structure in which the electrode mixture parts 120 and the irreversible parts 130 are alternately arranged on one surface 111, selected from between the opposite surfaces 111 and 112, and the structure in which the electrode mixture parts 120 and the irreversible parts 130 are alternately arranged on the other surface 112, selected from between the opposite surfaces 111 and 112, are identical to each other.

The electrode mixture parts 120 and the irreversible parts 130 are coated at predetermined intervals such that the electrode mixture parts 120 occupy 90% of the total area of the electrode when viewed from above.

In FIG. 1, the electrode mixture parts and the irreversible parts are coated at predetermined intervals, and the structure in which the electrode mixture parts and the irreversible parts are alternately arranged on one surface of the current collector and the structure in which the electrode mixture parts and the irreversible parts are alternately arranged on the other surface of the current collector are identical to each other. However, the present invention is not limited thereto. The electrode mixture parts and the irreversible parts may be alternately arranged so as to have various structures, as long as the electrode mixture parts and the irreversible parts are alternately arranged on the opposite surfaces of the current collector in the state in which the electrode mixture parts and the irreversible parts alternately arranged on one surface of the current collector and the electrode mixture parts and the irreversible parts alternately arranged on the other surface of the current collector are not affected by each other.

The inventors of the present application have found that, in the case in which an electrode is configured to have a structure in which electrode mixture parts, each of which includes an electrode active material, and irreversible parts, each of which includes an irreversible additive, are alternately arranged, as described above, it is possible to easily design irreversible efficiency, thereby effectively preventing the reduction of irreversible efficiency.

Specifically, in the case in which an irreversible additive is simply added to each of the electrode mixture parts, lithium escapes from the positive electrode during initial formation, and then the irreversible additive becomes an inactive material, with the result that the energy density of the positive electrode is reduced. In the case in which an irreversible additive is stacked on each of the electrode mixture parts, the thickness of the electrode is increased, with the result that it is difficult for the electrode to be completely impregnated with an electrolytic solution. In addition, the concentration of the electrolytic solution is polarized, with the result that the resistance of the electrode is increased, whereby the output of the electrode is reduced. In the case in which the electrode is configured to have a structure in which the irreversible additives and the electrode mixture parts are alternately arranged, as described above, it is possible to solve the above problems. Consequently, the present invention has excellent structural advantages.

Meanwhile, the irreversible additive, which is included in each of the irreversible parts, may have an operation voltage of 1.0 V to 2.5 V with respect to Li.

Accordingly, since the operation voltage of the irreversible additive is lower than that of a positive electrode, which is 2.5 to 4.25 V, and is higher than that of a negative electrode, which is 0.05 to 1.5 V, the irreversible additive participates in reaction only during initial charging and does not participate in reaction during discharging. Consequently, the irreversible efficiency of the battery may be effectively designed.

In particular, in the case in which the electrode is a negative electrode, it is possible to reduce the irreversible efficiency of the negative electrode. In a secondary battery including a negative electrode having higher irreversible efficiency than that of a positive electrode, it is possible to reduce the total amount of an negative electrode active material that is used, whereby it is possible to more effectively design the irreversible efficiency of the battery.

In addition, the irreversible additive may exhibit higher conductivity than the electrode active material. It is possible to improve the output characteristics of the electrode by improving the conductive network composition of the electrode. In this case, the irreversible additive may have an electric resistance value of 5 μΩm to 100 μΩm.

Meanwhile, the kind of irreversible additive may be changed depending on whether the electrode is a positive electrode or a negative electrode.

In an example, the electrode may be a positive electrode, and the irreversible additive may be a lithiated lithium titanium oxide (LTO) or lithium molybdenum compound.

Specifically, the irreversible additive may be a lithium titanium oxide represented by $Li_{7/3}Ti_{5/3}O_4$. Alternatively, the irreversible additive may be a lithium molybdenum sulfide, represented by Formula 1 below: $Li_{2+x}Mo_{6-y}M_yS_{8-z}$ (1) where $-0.1 \le x \le 0.5$, $0 \le y \le 0.5$, $-0.1 \le z \le 0.5$, and M is a metal or transition metal cation having an oxidation number of +2 to +4. Specifically, the lithium molybdenum sulfide may be $Li_{2.3}Mo_6S_{7.7}$.

In another example, the electrode may be a negative electrode. In this case, the irreversible additive may be a molybdenum compound. Specifically, the irreversible additive is a molybdenum sulfide, represented by Formula 2 below: $Mo_aS_b$ (2), where a ratio of a to b (a/b) is ½ to 1. More specifically, the molybdenum sulfide may be $Mo_6S_8$.

The irreversible additive may be provided in an amount of 80 wt % to 99 wt % with respect to the total weight of the irreversible parts. Each of the irreversible parts may further include a binder or a binder and a conductive agent, in addition to the irreversible additive.

Concrete examples of the binder and the conductive agent may be identical to concrete examples of a binder and a conductive agent that are included in each of the electrode mixture parts. The use of the binder and the conductive agent is not limited. Specifically, the binder and the conductive agent that are included in each of the electrode mixture parts and the binder and the conductive agent that are included in each of the irreversible parts may be the same materials.

In addition, the contents of the binder and the conductive agent that are included in each of the irreversible parts are not particularly restricted, as long as the irreversible parts have sufficient coupling force with respect to the current collector. Specifically, the contents of the binder and the conductive agent that are included in each of the irreversible parts may be equal to or less than the contents of the binder that is included in each of the electrode mixture parts.

In the electrode according to the present invention, it is possible to easily design irreversible efficiency by including the irreversible additive, as described above. Meanwhile, high loading of the electrode mixture parts, each of which includes an electrode active material, is necessary to increase the capacity of the battery. In the electrode according to the present invention, in order to solve problems in which impregnation with an electrolytic solution is difficult and the concentration of the electrolytic solution is polarized due to an increase in the thickness of the electrode, it is possible to adjust the aperture ratio of the electrode mixture parts, each of which includes an electrode active material, and the aperture ratio of the irreversible parts, each of which includes an irreversible additive, such that the aperture ratio of the electrode mixture parts and the aperture ratio of the irreversible parts are different from each other.

In a concrete example, each of the electrode mixture parts may have an aperture ratio of 5% to 40%, and each of the irreversible parts may have an aperture ratio of 20% to 90%.

That is, in the present invention, the aperture ratio of each of the electrode mixture parts, each of which includes an electrode active material, which directly affects the capacity of the battery, may be adjusted so as to be low, whereby it is possible to maintain high density of the electrode and thus to increase the capacity of the battery. In addition, the aperture ratio of each of the irreversible parts, each of which includes an irreversible additive, which does not affect the capacity of the battery, may be adjusted so as to be high, whereby it is possible to improve impregnation with the electrolytic solution and to prevent the concentration of the electrolytic solution from being polarized.

The electrode active material may be a positive electrode active material or a negative electrode active material, depending on the kind of the electrode.

Examples of the positive electrode active material may include layered compounds, such as lithium cobalt oxide ($LiCoO_2$) and lithium nickel oxide ($LiNiO_2$), or compounds substituted with one or more transition metals, such as $LiNi_xMn_yCo_zO_2(x+y+z=1)$; lithium manganese oxides represented by $Li_{1+x}Mn_{2-x}O_4$ where $0 \le x \le 0.33$, such as $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides having formula $LiNi_{1-x}M_xO_2$ where M=Co, Mn, Al, Cu, Fe, Mg, B, or Ga, and $0.01 \le x \le 0.3$; lithium manganese composite oxides having formula $LiMn_{2-x}M_xO_2$ where M=Co, Ni, Fe, Cr, Zn, or Ta, and $0.01 \leq x \leq 0.1$ or formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ having a chemical formula in which Li is partially replaced by alkaline earth metal ions; disulfide compounds; lithium iron phosphate, such as $LiFePO_4$, or lithium iron phosphate having Fe substituted with one or more transition metals, or $Fe_2(MoO_4)_3$. However, the present invention is not limited thereto.

The negative electrode active material may include at least one carbon-based material selected from the group consisting of artificial crystalline graphite, natural crystalline graphite, amorphous hard carbon, low-crystalline soft carbon, carbon black, acetylene black, Ketjen black, Super-P, graphene, and fibrous carbon, Si or Si compounds, metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; or lithium titanium oxides. Specifically, the negative electrode active material may be a carbon-based material or a mixture of a carbon-based material and an Si compound. However, the present invention is not limited thereto.

In the present invention, it is possible to appropriately adjust the content of the irreversible additive based on the composition of the electrode active material, whereby it is possible to easily design irreversible efficiency.

In general, the current collector has a thickness of 3 to 500 μm. The current collector is not particularly restricted so long as the current collector exhibits high conductivity while the current collector does not induce any chemical change in a battery to which the current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. The negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. The current collector may have a micro-scale uneven pattern formed at the surface thereof so as to increase the adhesive force of the electrode active material. The current collector may be configured in various forms, such as a film, a sheet, a foil, a net, a porous body, a foam body, and a non-woven fabric body.

Each of the electrode mixture parts may be constituted by an electrode mixture further including a conductive agent and/or a binder, in addition to the electrode active material. A filler may be further added as needed.

The conductive agent is generally added such that the conductive agent has 1 to 50 weight % based on the total weight of the electrode mixture including the electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and the conductive agent and in binding with the current collector. The binder is generally added in an amount of 1 to 50 weight % based on the total weight of the electrode mixture including the electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

In accordance with another aspect of the present invention, there is provided a secondary battery configured such that an electrode assembly including the electrode is impregnated with an electrolytic solution.

The electrode assembly generally includes a positive electrode, as an example of the electrode, a negative electrode, as another example of the electrode, and a separator interposed between the positive electrode and the negative electrode.

An insulative thin film exhibiting high ion permeability and high mechanical strength may be used as the separator. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrolytic solution may include a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the electrolytic solution may further include carbon dioxide gas. In addition, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and linear carbonate, such as DEC, DMC, or EMC, which is a low viscosity solvent, to manufacture an electrolytic solution.

In accordance with other aspects of the present invention, there are provided a battery module including the secondary battery as a unit cell, a battery pack including the battery module, and a device including the battery pack as a power source.

A specific example of the device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a plan view and a side view showing an electrode according to an embodiment of the present invention.

BEST MODE

Now, the present invention will be described in more detail with reference to the following examples. These examples are provided only for illustration of the present invention and should not be construed as limiting the scope of the present invention.

Example 1

Preparation of a Positive Electrode Mixture Part 94 wt % of a lithium nickel-based oxide ($Li(NiMnCo)_{1/3}O_2$) as a positive electrode active material, 3 wt % of Super-P as a conductive agent, and 3 wt % of PVdF as a binder were added to N-methyl-2-pyrrolidone (NMP) as a solvent, thereby preparing a positive electrode mixture.

Preparation of an Irreversible Part 94 wt % of a lithium titanium oxide ($Li(Li_{1/3}Ti_{5/3})O_4$) as an irreversible additive, 3 wt % of Super-P as a conductive agent, and 3 wt % of PVdF as a binder were added to N-methyl-2-pyrrolidone (NMP) as a solvent, thereby preparing an irreversible additive mixture.

Manufacture of a Positive Electrode

The positive electrode mixture and the irreversible additive mixture were alternately coated, dried, and pressed on aluminum foil having a thickness of 15 μm, as shown in FIG. 1, thereby manufacturing a positive electrode. At this time, the positive electrode mixture part had an aperture ratio of 25%, and the irreversible part had an aperture ratio of 40%.

Example 2

A positive electrode mixture part was prepared, an irreversible part was prepared, and a positive electrode was manufactured in the same manner as in Example 1 except that 94 wt % of a lithium molybdenum sulfide ($Li_{2.3}Mo_6S_{7.7}$) was used as the irreversible additive in place of a lithium titanium oxide ($Li(Li_{1/3}Ti_{5/3})O_4$). At this time, the positive electrode mixture part had an aperture ratio of 25%, and the irreversible part had an aperture ratio of 40%.

Comparative Example 1

89 wt % of a lithium nickel-based oxide ($Li(NiMnCo)_{1/3}O_2$) as a positive electrode active material, 3 wt % of Super-P as a conductive agent, 3 wt % of PVdF as a binder, and 5 wt % of a lithium molybdenum sulfide ($Li_{2.3}Mo_6S_{7.7}$) as an irreversible additive were added to N-methyl-2-pyrrolidone (NMP) as a solvent, thereby preparing a positive electrode mixture. The positive electrode mixture was coated, dried, and pressed on aluminum foil having a thickness of 15 μm, thereby manufacturing a positive electrode. At this time, the positive electrode mixture layer had an aperture ratio of 25%.

Comparative Example 2

94 wt % of a lithium nickel-based oxide ($Li(NiMnCo)_{1/3}O_2$) as a positive electrode active material, 3 wt % of Super-P as a conductive agent, and 3 wt % of PVdF as a binder were added to N-methyl-2-pyrrolidone (NMP) as a solvent, thereby preparing a positive electrode mixture. The positive electrode mixture was coated on aluminum foil having a thickness of 15 μm. 94 wt % of a lithium molybdenum sulfide ($Li_{2.3}Mo_6S_{7.7}$) as an irreversible additive, 3 wt % of Super-P as a conductive agent, and 3 wt % of PVdF as a binder were added to N-methyl-2-pyrrolidone (NMP) as a solvent, thereby preparing an irreversible additive mixture. The irreversible additive mixture was coated, dried, and pressed on the positive electrode mixture layer, which was coated on the aluminum foil, such that the irreversible additive mixture had a thickness of 5 μm, thereby manufacturing a positive electrode. At this time, the positive electrode mixture layer had an aperture ratio of 25%, and the irreversible additive layer had an aperture ratio of 40%.

Comparative Example 3

92 wt % of a lithium nickel-based oxide (Li(NiMnCo)$_{1/3}$O$_2$) as a positive electrode active material, 3 wt % of Super-P as a conductive agent, 3 wt % of PVdF as a binder, and 2 wt % of a lithium titanium oxide (Li(Li$_{1/3}$Ti$_{5/3}$)O$_4$) as an irreversible additive were added to N-methyl-2-pyrrolidone (NMP) as a solvent, thereby preparing a positive electrode mixture. The positive electrode mixture was coated, dried, and pressed on aluminum foil having a thickness of 15 μm, thereby manufacturing a positive electrode. At this time, the positive electrode mixture layer had an aperture ratio of 25%.

Comparative Example 4

94 wt % of a lithium nickel-based oxide (Li(NiMnCo)$_{1/3}$O$_2$) as a positive electrode active material, 3 wt % of Super-P as a conductive agent, and 3 wt % of PVdF as a binder were added to N-methyl-2-pyrrolidone (NMP) as a solvent, thereby preparing a positive electrode mixture. The positive electrode mixture was coated on aluminum foil having a thickness of 15 μm. 94 wt % of a lithium titanium oxide (Li(Li$_{1/3}$Ti$_{5/3}$)O$_4$) as an irreversible additive, 3 wt % of Super-P as a conductive agent, and 3 wt % of PVdF as a binder were added to N-methyl-2-pyrrolidone (NMP) as a solvent, thereby preparing an irreversible additive mixture. The irreversible additive mixture was coated, dried, and pressed on the positive electrode mixture layer, which was coated on the aluminum foil, such that the irreversible additive mixture had a thickness of 5 μm, thereby manufacturing a positive electrode. At this time, the positive electrode mixture layer had an aperture ratio of 25%, and the irreversible additive layer had an aperture ratio of 40%.

Comparative Example 5

94 wt % of a lithium nickel-based oxide (Li(NiMnCo)$_{1/3}$O$_2$) as a positive electrode active material, 3 wt % of Super-P as a conductive agent, and 3 wt % of PVdF as a binder, were added to N-methyl-2-pyrrolidone (NMP) as a solvent, in the state in which a lithium molybdenum sulfide (Li$_{2.3}$Mo$_6$S$_{7.7}$) or a lithium titanium oxide (Li(Li$_{1/3}$Ti$_{5/3}$)O$_4$) was not added or coated, thereby preparing a positive electrode mixture. The positive electrode mixture was coated, dried, and pressed on aluminum foil having a thickness of 15 μm, thereby manufacturing a positive electrode. At this time, the positive electrode mixture layer had an aperture ratio of 25%. That is, the positive electrode was manufactured such that the positive electrode mixture part occupied 100% of the area of the positive electrode.

Experimental Example 1

84 wt % of artificial graphite and 10 wt % of a silicon oxide (SiO) as a negative electrode active material, 2 wt % of Super-P as a conductive agent, 3 wt % of styrene butadiene rubber (SBR) as a binder, and 1 wt % of carboxymethyl cellulose (CMC) as both a thickener and binder were added to distilled water as a solvent, thereby preparing a negative electrode mixture. The negative electrode mixture was coated on copper foil having a thickness of 10 μm, thereby manufacturing a negative electrode. The negative electrode had an irreversible efficiency of about 86% (charge capacity: 245 mAh/g).

The irreversible efficiencies of the positive electrodes manufactured according to Examples 1 and 4 and Comparative Examples 1 to 5 and the measured capacities of batteries, manufactured such that each of the batteries included the positive electrode and the negative electrode, are shown in Table 1.

TABLE 1

| | Negative electrode efficiency | Positive electrode efficiency | Battery capacity |
|---|---|---|---|
| Example 1 | 86.3% | 87.1% | 79.0 Ah |
| Example 2 | | 87.0% | 79.2 Ah |
| Comparative Example 1 | | 86.9% | 79.4 Ah |
| Comparative Example 2 | | 86.8% | 79.4 Ah |
| Comparative Example 3 | | 87.0% | 79.1 Ah |
| Comparative Example 4 | | 87.1% | 79.0 Ah |
| Comparative Example 5 | | 91.2% | 75 Ah |

As shown in Table 1 above, it can be seen that the differences in irreversible efficiency between the positive electrodes including the lithium molybdenum sulfide or the lithium titanium oxide as the irreversible additive according to Examples 1 and 2 and the negative electrodes are smaller than the difference in irreversible efficiency between the positive electrode not including the irreversible additive according to Comparative Example 5 and the negative electrode and that the capacities of batteries manufactured using the positive electrodes according to Examples 1 and 2 and the negative electrodes are higher than the capacity of a battery manufactured using the positive electrode according to Comparative Example 5 and the negative electrode. This means that the battery capacities are increased because the lithium, as an irreversible agent of the negative electrode, increases the irreversibility of the positive electrode.

The reason for this is that the lithium molybdenum sulfide and the lithium titanium oxide participate in reaction only during initial charging, and do not participate in reaction during discharging, because the operation voltages of the lithium molybdenum sulfide and lithium titanium oxide, which are within a range of 1.0 V to 2.5 V with respect to Li, are lower than the operation voltage of the positive electrode.

Consequently, it can be seen that, when the lithium molybdenum sulfide or the lithium titanium oxide serving as the irreversible additive was included in the positive electrode, the total capacity and the energy density per unit volume of a battery cell may be maximized by adjusting the initial irreversible efficiency of the positive electrode within a range similar to that of the negative electrode.

Experimental Example 2

The positive electrodes manufactured according to Examples 1 and 2 and Comparative Examples 1 to 5 were immersed into an electrolytic solution, and the amount of time taken until the degree of impregnation reached about 80% was measured. The results are shown in Table 2 below. The degree of impregnation is the ratio of electrode weight incremental to the initial electrode weight, expressed as a percentage, when an electrode is impregnated with an electrolytic solution.

TABLE 2

| | Degree of impregnation (time, sec) |
|---|---|
| Example 1 | 2705 |
| Example 2 | 2580 |
| Comparative Example 1 | 4050 |
| Comparative Example 2 | 3570 |
| Comparative Example 3 | 3950 |
| Comparative Example 4 | 3490 |
| Comparative Example 5 | 3900 |

As shown in Table 2 above, it can be seen that the electrodes according to Examples 1 and 2 of the present invention achieved desired degrees of impregnation within a shorter time than the electrodes according to Comparative Examples 1 and 3, in each of which the irreversible additive was simply mixed with the positive electrode mixture, the electrodes according to Comparative Examples 2 and 4, in each of which the irreversible additive layer was formed on the positive electrode mixture layer, and the electrode according to Comparative Example 5, in which only the positive electrode mixture layer, which had a low aperture ratio, was provided.

Experimental Example 3

Batteries were manufactured using the positive electrodes manufactured according to Examples 1 and 2 and Comparative Examples 1 and 5 and the negative electrode manufactured according to Experimental Example 1, and 10-second discharge resistance of the batteries for each SOC were measured. The results are shown in Table 3 below.

TABLE 3

| | Resistance (mohm) | | | | |
|---|---|---|---|---|---|
| | SOC5 | SOC25 | SOC50 | SOC75 | SOC95 |
| Example 1 | 1.84 | 1.60 | 1.53 | 1.52 | 1.52 |
| Example 2 | 1.84 | 1.58 | 1.52 | 1.52 | 1.51 |
| Comparative Example 1 | 1.96 | 1.66 | 1.58 | 1.58 | 1.59 |
| Comparative Example 5 | 1.87 | 1.63 | 1.56 | 1.56 | 1.56 |

Referring to Table 3, it can be seen that the batteries using the positive electrodes manufactured according to Examples 1 and 2 exhibit better output characteristics than the batteries using the positive electrodes manufactured according to Comparative Examples 1 and 5. The reason for this is that the positive electrodes manufactured according to Examples 1 and 2 are characterized in that the irreversible part, which had a high aperture ratio, is coated on the current collector together with the electrode mixture part, whereby the degree of impregnation with the electrolytic solution is increased, as can be seen from Experimental Example 2, and therefore the electrode resistance is reduced.

In the electrode according to the present invention, therefore, it is possible to easily adjust irreversible efficiency through the use of the irreversible additive. In addition, it is possible to exhibit excellent output characteristics over the entire SOC range by improving the degree of impregnation with the electrolytic solution.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode according to the present invention is configured such that electrode mixture parts, each of which includes an electrode active material, and irreversible parts, each of which includes an irreversible additive, are alternately arranged. Consequently, it is possible to easily adjust irreversible efficiency based on the contents of the irreversible additive and the distribution of the irreversible parts. In addition, it is possible to improve impregnation with an electrolytic solution while exhibiting high-capacity characteristics by adjusting the aperture ratio of the electrode mixture parts and the aperture ratio of the irreversible parts. As a result, it is possible to prevent the concentration of the electrolytic solution from being polarized. Consequently, it is possible to restrain an increase in the resistance of a battery such that the battery exhibits excellent output characteristics.

The invention claimed is:

1. An electrode configured such that electrode mixture parts, each of which comprises an electrode active material, and irreversible parts, each of which comprises an irreversible additive, are alternately coated on one surface or both surfaces of a current collector to form an electrode pattern,
wherein the electrode is a positive electrode, and wherein the irreversible additive is a lithiated lithium titanium oxide (LTO) represented by $Li_{7/3}Ti_{5/3}O_4$ or a lithium molybdenum sulfide represented by Formula 1 below:

$$Li_{2+x}MO_{6-y}M_yS_{8-z} \quad (1)$$

where $-0.1 \leq x \leq 0.5$, $0 \leq y \leq 0.5$, $-0.1 \leq z \leq 0.5$, and
M is a metal or transition metal cation having an oxidation number of +2 to +4.

2. The electrode according to claim 1, wherein the electrode mixture parts and the irreversible parts are alternately arranged in a vertical direction or a horizontal direction on a basis of a direction in which an electrode terminal of the electrode is formed.

3. The electrode according to claim 1, wherein each of the electrode mixture parts and the irreversible parts is formed in a strip shape when viewed from above.

4. The electrode according to claim 1, wherein the electrode mixture parts and irreversible parts are alternately arranged on the opposite surfaces of the current collector, and wherein a structure in which the electrode mixture parts and the irreversible parts that are alternately arranged on one surface of the current collector and a structure in which the electrode mixture parts and the irreversible parts that are alternately arranged on the other surface of the current collector are identical to each other.

5. The electrode according to claim 1, wherein the electrode mixture parts are coated on 10 to 99% of a total area of the electrode when viewed from above.

6. The electrode according to claim 5, wherein the electrode mixture parts are coated on 50 to 99% of a total area of the electrode when viewed from above.

7. The electrode according to claim 1, wherein the electrode mixture parts are coated at predetermined intervals.

8. The electrode according to claim 1, wherein the irreversible parts are coated at predetermined intervals.

9. The electrode according to claim 1, wherein the irreversible additive has an operation voltage of 1.0 V to 2.5 V with respect to Li.

10. The electrode according to claim 1, wherein the irreversible additive exhibits higher conductivity than the electrode active material.

11. The electrode according to claim 1, wherein the lithium molybdenum sulfide is $Li_{2.3}Mo_6S_{7.7}$.

12. The electrode according to claim 1, wherein the irreversible additive is provided in an amount of 80 wt % to 99 wt % with respect to a total weight of the irreversible parts.

13. The electrode according to claim 1, wherein each of the irreversible parts further comprises a binder or a binder and a conductive agent, in addition to the irreversible additive.

14. The electrode according to claim 1, wherein each of the electrode mixture parts has an aperture ratio of 5% to 40%.

15. The electrode according to claim 1, wherein each of the irreversible parts has an aperture ratio of 20% to 90%.

16. A secondary battery configured such that an electrode assembly comprising the electrode according to claim 1 is impregnated with an electrolytic solution.

17. A battery module comprising the secondary battery according to claim 16 as a unit cell.

18. A battery pack comprising the battery module according to claim 17.

19. A device comprising the battery pack according to claim 18 as a power source.

20. The device according to claim 19, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

* * * * *